United States Patent [19]

Shirahata et al.

[11] 4,286,299

[45] Aug. 25, 1981

[54] MAGNETIC HEAD ASSEMBLY FOR RECORDING OR REPRODUCING VERTICALLY MAGNETIZED RECORDS

[75] Inventors: Ryuji Shirahata; Tatsuji Kitamoto, both of Odawara, Japan

[73] Assignee: Fuji Photo Film Co., Ltd., Minami-ashigara, Japan

[21] Appl. No.: 83,712

[22] Filed: Oct. 11, 1979

[30] Foreign Application Priority Data

Oct. 17, 1978 [JP] Japan ................... 53-127661

[51] Int. Cl.³ .......................... G11B 5/12; G11B 5/20
[52] U.S. Cl. ..................... 360/113; 360/123
[58] Field of Search ............. 360/113, 123, 122, 125, 360/128, 121, 119

[56] References Cited

U.S. PATENT DOCUMENTS

| | | | |
|---|---|---|---|
| 2,675,429 | 4/1954 | Rohling | 360/123 |
| 3,064,087 | 11/1962 | Gabor | 360/123 |
| 3,230,517 | 1/1966 | Supernowicz | 360/123 |
| 3,493,694 | 2/1970 | Hunt | 360/113 |
| 3,840,898 | 10/1974 | Bajorek | 360/113 |
| 3,921,217 | 11/1975 | Thompson | 360/113 |
| 3,921,218 | 11/1975 | Kayser | 360/113 |

*Primary Examiner*—Alfred H. Eddleman
*Attorney, Agent, or Firm*—Sughrue, Rothwell, Mion, Zinn and Macpeak

[57] ABSTRACT

A magnetic head assembly for recording and playing back information on a recording medium in a vertically magnetized mode. Main and auxiliary heads are provided opposite one another with the recording medium passing therebetween. The main head includes a core of material exhibiting a magnetoresistance effect to which core are attached leads which carry the output play back signal. The auxiliary head has a magnetic core around which is wrapped a winding carrying the recording current. The recorded information patterns have their primary magnetic field components perpendicular to the surface of the recording medium.

4 Claims, 1 Drawing Figure

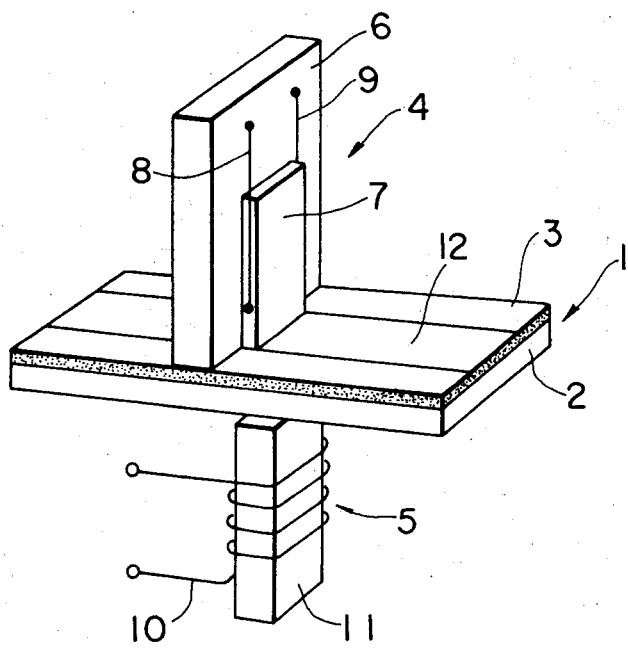

MAGNETIC HEAD ASSEMBLY FOR RECORDING OR REPRODUCING VERTICALLY MAGNETIZED RECORDS

BACKGROUND OF THE INVENTION

This invention relates to magnetic head assemblies for producing a vertically magnetized record and more particularly to magnetic head assemblies for producing a vertically magnetized record which is also capable of reading or reproducing vertically magnetized recorded information.

A magnetic recording method has been previously known in which information is written onto and read off a magnetic recording medium having a magnetic layer with a ring-type magnetic head having a nonmagnetic gap. The magnetic layer may have been formed by dispersing in a binder a magnetic powder of $\gamma$-$Fe_2O_3$, $\gamma$-$Fe_2O_3$ doped with Co, $Fe_3O_4$ doped with Co, a berthollide compound of $\gamma$-$Fe_2O_3$ and $Fe_3O_4$, $CrO_2$ or ferromagnetic metallic alloy. This magnetic recording method is extensively employed to record and reproduce audio signals, video signals, measurement signals, and digital signals used in computers. Furthermore, since the quantity of information to be recorded is increasing day-by-day, a method of recording signals of short wavelength in a magnetic recording medium has been in strong demand so that the recording density may be increased.

However, it should be noted that the conventional magnetic recording method is a so-called "butt magnetization system" in which a ring-type magnetic head is used to magnetize the magnetic layer lengthwise along a track in parallel with the longitudinal direction of the magnetic recording medium to record information. Because of this, if the wavelength of data to be recorded is short, the self-demagnetization loss is increased, and accordingly, a sufficient output can not be obtained.

In addition, this magnetic recording system has a recording demagnetization action which results in difficulties in recording signals of short wavelengths. That is, when the magnetic recording medium moves relative to the ring-type magnetic recording head, the recording point in the magnetic recording medium is subjected to polarity inversion by a magnetic field signal created by the recording head so that a rotational magnetization mode occurs in the magnetic recording layer. As the rotational magnetic mode has a closed magnetic path, the leakage magnetic field outside the magnetic recording medium is greatly decreased and no lines of magnetic force are available to be picked up by the reproducing head so that no data is apparently recorded. Accordingly, it is not possible to reproduce any output.

This phenomenon becomes significant when the wavelength of data to be recorded is short. The output of reproduction can be increased to an extent by increasing the recording current, however, this quickly reaches a maximum value. If the recording current were to be still further increased, a "dip" phenomenon occurs in which the reproduced output decreases then reaches a second maximum value. Thus, it is fundamentally impossible to solve the problem by increasing the recording current. The phenomenon occurs in magnetic recording methods using either a bias system or a biasless system. In either case, it is quite difficult to increase the magnetic record density.

A magnetic recording system which overcomes these problems and makes it possible to record data of short wavelengths has been disclosed. Such a system is a vertical magnetization system in which the magnetic recording layer is magnetized perpendicularly to the surface of the surface of the magnetic recording medium in order to record information.

In this recording system, a main head for vertical magnetization is provided on the magnetic recording layer side of a magnetic recording medium of which a magnetic recording layer is formed on a supporting substrate and an auxiliary head is provided on the opposite side of the same. The auxiliary head is provided with a winding. A current modulated in accordance with information to be recorded is supplied to this winding to create a magnetic field which magnetizes the main head. A vertical magnetic field created simultaneously magnetizes the recording medium to produce the vertical magnetization recording. Signals recorded according to this vertical magnetization recording system may be reproduced or played back using the same head as used for recording. However, if the film thickness (corresponding to the gap of the ring-type head) of the main head is reduced, the reproduction sensitivity is lowered considerably for reproducing signals of short wavelengths. Thus, the method is not entirely suitable for the reproduction of signals of short wavelengths which is a supposed advantage of the prior art vertical magnetization recording system.

A reproduction method using a conventional ring-type head for signals recorded using the vertical magnetization recording system has been proposed. However, this method suffers from problems in implementation in that reproduction of signals of short wavelengths cannot be adequately carried out because of a so-called "gap loss". Also, track positioning and azimuth adjustments with respect to the vertical magnetization recording head are necessitated.

SUMMARY OF THE INVENTION

Accordingly, an object of this invention is to provide a novel vertical magnetization recording and reproducing head assembly in which all of the above-described difficulties have been eliminated. More specifically, an object of the invention is to provide a magnetic head assembly which can record information in a magnetic recording medium in accordance with the vertical magnetization recording system and which can reproduce the information with high sensitivity.

The specific novel features of a magnetic head assembly according to the invention reside in that the magnetic head assembly includes a main head and an auxiliary head which are disposed on opposite sides of a magnetic recording medium, respectively with the main head functioning as a magnetoresistance effect element. The term "main head" as herein used is intended to mean a head which is disposed on the magnetic recording layer side of the magnetic recording medium while the term "auxiliary head" is intended to mean a head which is arranged on the support or opposite side of the magnetic recording medium.

BRIEF DESCRIPTION OF THE DRAWING

FIG. 1 is a perspective view showing an arrangement of a magnetic assembly according to this invention.

DESCRIPTION OF THE PREFERRED EMBODIMENTS

A magnetic head assembly according to the present invention will be described with reference to the single accompanying drawing figure which is a perspective view showing a magnetic head assembly of the invention. A magnetic recording medium 1 includes a flexible support 2 in the form of a tape or a sheet and a magnetic layer 3 formed on the flexible support 2 by coating, plating (electroplating or nonelectrolytic plating), vacuum evaporation, ion plating, sputtering, or chemical vapor phase deposition. It is desirable that the preferred or "easy" axis of magnetization of the magnetic layer be perpendicular to the magnetic surface. Such a magnetic layer can be produced by a method in which a magnetic power such as MnBi, Ba ferrite or iron oxide is dispersed in a binder and is then coated on the flexible support in such a manner that it is magnetically orientated perpendicularly. Otherwise, the magnetic layer may be formed with Co-Cr, Co-Gd, Fe-Tb or Mn-Bi by sputtering or vacuum evaporation.

The vertical magnetization recording head assembly of the invention has a main head 4 and an auxiliary head 5 which are disposed on opposite sides of the magnetic recording medium 1. The main head 4 includes a substrate 6 and a material 7 provided on the substrate 6 having a magnetoresistance effect characteristic. The term "magnetoresistance effect" as used herein is intended to refer to the phenomenon that when a magnetic field is applied to a ferromagnetic substance its electrical resistance is changed. A Ni-Fe alloy is suitable as the material 7. However, it should be noted of course that the material is not limited to this specific alloy only. The material 7 is provided with electrode lead wires 8 and 9 for detecting the variation of its resistance. The auxiliary head 5 includes a magnetic material 11 and a winding 10 wound on the magnetic material 11. The magnetic material 11 is made of, for example, permalloy, and has a rectangular cross section at its end. The magnetic material 11 is disposed adjacent one end of the material 7 to confront the latter. Accordingly, with the above-described arrangement, the defect of the gap accompanying the conventional ring-type magnetic head is totally eliminated.

Operationally, to subject the magnetic recording medium 1 to vertical magnetization recording with the inventive magnetic head assembly described above, first the magnetic recording medium 1 is moved relative to the head assembly while current modulated in accordance with information to be recorded is supplied to the winding 10 of the auxiliary head 5. As a result, a magnetic field modulated according to the information to be recorded is generated perpendicular to the magnetic recording medium 1 between the main head 4 and the auxiliary head 5 with the result that the information is recorded in the form of a vertical magnetization pattern along the track 12 of the magnetic layer.

To read out or playback the information magnetization pattern recorded on the magnetic recording medium, current is supplied between the electrode lead wires 8 and 9 with the resultant current flowing perpendicular to the longtiudinal direction of the track 12. A magnetic field signal created by the vertical magnetization information pattern of the magnetic layer 3 perpendicular to the magnetic layer 3 and in parallel with the material 7 induces electrical resistance variations which are detected as variations in voltage across the electrode lead wires 8 and 9.

In the vertical magnetic recording system of the invention, the magnetic field signal created by the magnetic layer 3 is perpendicular to the magnetic layer 3 as opposed to the magnetic field which lies in the plane of the recording medium of the prior art techniques. Accordingly, the vertical magnetic recording system can record and reproduce recorded information with higher a sensitivity than a conventional magnetization recording system as described above due to the fact that the in-plane closed magnetic loops are eliminated.

Furthermore, as with the inventive magnetic head assembly both recording and reproducing of information can be carried out utilizing the vertical magnetization recording system, supplementary procedures such as track positioning and azimuth adjustment which were required by prior art techniques are not necessary. Moreover, the magnetic head assembly according to the invention is simple in structure and can be therefore easily manufactured.

In the magnetic head assembly described above, the auxiliary head 5 has a winding 10. However, the assembly may be so modified that the main head 4 has a winding or both of the main head 4 and the auxiliary head 5 have windings. Furthermore, means for applying a DC bias magnetic field to the magnetic field produced by the main head 4 may be provided integrally with the main head 4 to improve the sensitivity and to obtain linear response characteristics with respect to the magnetic field signal created by the magnetic recording medium 1.

What is claimed is:

1. A magnetic head assembly for recording and reproducing information on a recording medium in the form of vertical magnetization patterns having a primary magnetic field component perpendicular to said recording medium comprising:

a main head, said main head comprising a substrate, a member having a magnetoresistance effect provided on said substrate, and first and second lead terminals coupled to said member for detecting a variation of the resistance of said member, wherein said member comprises a body of material having a rectangular cross section at an end adjacent to and parallel with a surface of said recording medium and extending further in a direction perpendicular to the direction of movement of said recording medium than in a direction parallel to said direction of movement; and an auxiliary head disposed on an opposite side of said recording medium opposite said main head, said auxiliary head comprising a winding and a magnetic member for producing a magnetic field in response to a current in said winding, wherein said magnetic member has a rectangular cross section at an end adjacent to and parallel with an opposite surface of said recording medium and extending further in a direction perpendicular to the direction of movement of said recording medium than in a direction parallel to said direction of movement.

2. The magnetic head assembly of claim 1 further comprising a winding on said member having a magnetoresistance effect.

3. The magnetic head assembly of any of claims 1 or 2 wherein said member having a magnetoresistance effect comprises a body of Ni-Fe alloy.

4. The magnetic head assembly of any of claims 1 or 2 further comprising means for providing a bias magnetic field.

* * * * *